(12) United States Patent
Kawamura (10) Patent No.: US 11,492,145 B2
(45) Date of Patent: Nov. 8, 2022

(54) DEPLOYABLE RADIATOR

(71) Applicant: Mitsubishi Electric Corporation, Chiyoda-ku (JP)

(72) Inventor: Shunichi Kawamura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 616 days.

(21) Appl. No.: 16/347,266

(22) PCT Filed: Mar. 9, 2017

(86) PCT No.: PCT/JP2017/009513
§ 371 (c)(1),
(2) Date: May 3, 2019

(87) PCT Pub. No.: WO2018/116490
PCT Pub. Date: Jun. 28, 2018

(65) Prior Publication Data
US 2019/0329912 A1     Oct. 31, 2019

(30) Foreign Application Priority Data
Dec. 19, 2016 (JP) .............................. JP2016-245932

(51) Int. Cl.
*B64G 1/50* (2006.01)
*B23P 15/26* (2006.01)
*B64G 1/44* (2006.01)

(52) U.S. Cl.
CPC .............. *B64G 1/503* (2013.01); *B23P 15/26* (2013.01); *B64G 1/44* (2013.01); *B64G 1/506* (2013.01)

(58) Field of Classification Search
CPC .................................. B64G 1/503; B64G 1/44
See application file for complete search history.

(56) References Cited

U.S. PATENT DOCUMENTS 5,732,765 A * 3/1998 Drolen ..................... B64G 1/50
165/41
5,794,890 A * 8/1998 Jones, Jr. ............ F28D 15/0275
244/171.8
(Continued)

FOREIGN PATENT DOCUMENTS

JP        63-61700 A      3/1988
JP     2003-276696 A     10/2003
(Continued)

OTHER PUBLICATIONS

Extended European Search Report dated Oct. 10, 2019 in Patent Application No. 17884097.1, 9 pages.
(Continued)

*Primary Examiner* — Christopher D Hutchens
(74) *Attorney, Agent, or Firm* — Oblon, McClelland, Maier & Neustadt, L.L.P.

(57) ABSTRACT

A first deployment mechanism (30) deploys a first radiator panel (20) from a state where the first radiator panel (20) is opposed to a north or south face (10) of the body structure of a satellite. A second radiator panel (40) is stacked with the first radiator panel (20) to be opposed to the north or south face (10) of the body structure of the satellite and is sandwiched between the north and south face (10) of the body structure of the satellite and the first radiator panel (20), in a state where the first radiator panel (20) is opposed to the north or south face (10) of the body structure of the satellite. A second deployment mechanism (50) connects the second radiator panel (40) to the north or south face (10) of the body structure of the satellite, and deploys the second radiator panel (40) in a direction P2 opposite to a deployment direction P1 of the first radiator panel from a state where the second radiator panel (40) is opposed to the north or south face (10) of the body structure of the satellite.

14 Claims, 7 Drawing Sheets

(56) References Cited

U.S. PATENT DOCUMENTS

| | | | |
|---|---|---|---|
| 5,806,800 A * | 9/1998 | Caplin | B64G 1/503 165/41 |
| 6,220,548 B1 | 4/2001 | Hyman | |
| 2005/0156083 A1 | 7/2005 | Chaix et al. | |
| 2007/0221787 A1 * | 9/2007 | McKinnon | B64G 1/503 244/171.8 |
| 2008/0257525 A1 | 10/2008 | Ohnishi et al. | |
| 2008/0289801 A1 | 11/2008 | Batty et al. | |
| 2012/0217348 A1 * | 8/2012 | Aguirre Martinez | B64G 1/1021 244/158.5 |
| 2013/0200220 A1 * | 8/2013 | Goodzeit | B64G 1/506 244/171.8 |
| 2013/0200221 A1 | 8/2013 | Goodzeit et al. | |
| 2014/0299714 A1 | 10/2014 | Wong | |
| 2017/0320600 A1 * | 11/2017 | Cruijssen | B64G 1/222 |

FOREIGN PATENT DOCUMENTS

| | | |
|---|---|---|
| JP | 2003-312600 A | 11/2003 |
| JP | 2005-178773 A | 7/2005 |
| JP | 2008-265522 A | 11/2008 |
| JP | 2016-521225 A | 7/2016 |
| WO | WO 2014/126591 A2 | 8/2014 |

OTHER PUBLICATIONS

International Search Report dated May 30, 3017 in PCT/JP2017/009513 filed on Mar. 9, 2017.
Office Action dated Oct. 29, 2019 in corresponding Japanese Patent Application No. 2018-557515 (with English Translation), 6 pages.
European Office Action dated Jul. 19, 2021 in European Patent Application No. 17884097.1, 5 pages.
European Office Action dated Nov. 25, 2020 in European Patent Application No. 17884097.1, 5 pages.

* cited by examiner

DEPLOYABLE RADIATOR

TECHNICAL FIELD

The present invention relates to a deployable radiator that is mounted on a satellite.

BACKGROUND ART

In recent years, due to larger power consumption of an artificial satellite, an amount of heat removal from the satellite has steadily been increasing. A heat removal area becomes insufficient just by conventional heat removal from a body structure surface of the satellite, so that it is becoming impossible to ensure a necessary amount of the heat removal. A deployable radiator is applied in order to ensure this necessary heat removal area.

In the deployable radiator, a radiator panel is secured to the body structure surface of the satellite using a holding and releasing mechanism when the satellite is launched. The holding and releasing mechanism releases the radiator panel when the satellite reaches an orbit. After having been released, the radiator panel is deployed by a deployment mechanism, thereby increasing a heat removal area. The radiator panel includes a condenser tube, and the body structure of the satellite includes a steam pipe. These condenser tube and steam pipe are connected by a flexible tube through which a heat transport medium passes. A quantity of heat generated in the body structure of the satellite is transported to the condenser tube in the radiator panel by the heat transport medium in the steam pipe through the flexible tube and is removed from the heat removal surface of the radiator panel. An optical solar reflector (Optical Solar Reflector) is attached to the heat removal surface of the radiator panel.

Patent Literature 1 relates to a deployable radiator having an improved heat transport ability of a loop-type heat pipe. Patent Literature 1 also discloses a configuration in which a plurality of radiator panels are mounted on a satellite.

Patent Literature 2 relates to a system and an apparatus for restraining spacecraft heat loss during orbit raising or between transfer orbits. Patent Literature 2 discloses a technology for restraining an amount of heat removal by covering a heat removal surface by a thermal shield panel during the orbit raising and increasing the amount of the heat removal by deployment on a geostationary orbit.

Patent Literature 3 discloses a technology for stacking and stowing two radiator panels on each of west and east faces of a satellite in the satellite with four deployable radiators mounted thereon.

CITATION LIST

Patent Literature

Patent Literature 1: JP 2003-312600 A
Patent Literature 2: JP 2016-521225 A
Patent Literature 3: US 2013/200221 A1

SUMMARY OF INVENTION

Technical Problem

Due to an increase in an amount of heat removal caused by an increase in the size of a satellite, a necessary area for a radiator panel also increases. However, in terms of manufacturability, the radiator panel tends to be manufactured by being divided into a plurality of panels.

In each of Patent Literature 1 and Patent Literature 2, each of a plurality of radiator panels is independently held by the body structure of the satellite so that the plurality of radiator panels do not stack. Thus, holding and releasing mechanisms just corresponding to the number of the radiator panels become necessary. Thus, there is a problem that a mass of the satellite increases. Further, there is a problem that, since an occupation area when the radiator panels are stowed is large, a degree of freedom in disposition of apparatuses of the satellite is reduced.

In Patent Literature 3, the radiator panels are stacked and held on each of the east and west faces. Thus, north and south faces of the body structure of the satellite that are heat removal surfaces are exposed to space even before the radiator panels are deployed. Thus, an amount of heat removal is large, so that spacecraft heat loss during orbit raising cannot be restrained. Usually, the north and south faces of the body structure of the satellite are used as the heat removal surfaces, and the west and east faces are not used as the heat removal surfaces.

An object of the present invention is to provide a deployable radiator capable of reducing an increase in a mass of a satellite and improving a degree of freedom in disposition of apparatuses of the satellite. It is another object of the present invention is to restrain heat loss in a spacecraft during orbit raising and improve an amount of heat removal after the spacecraft has reached a geostationary orbit.

Solution to Problem

A deployable radiator of the present invention is a deployable radiator mounted on a body structure of a satellite. The deployable radiator may include:

a first radiator panel;

a first deployment mechanism to connect the first radiator panel to the body structure of the satellite and to deploy the first radiator panel from a state where the first radiator panel is opposed to a north or south face of the body structure of the satellite;

a second radiator panel stacked with the first radiator panel to be opposed to the north or south face of the body structure of the satellite and sandwiched between the north or south face of the body structure of the satellite and the first radiator panel, in the state where the first radiator panel is opposed to the north or south face of the body structure of the satellite; and a second deployment mechanism to connect the second radiator panel to the body structure of the satellite and to deploy the second radiator panel in a direction opposite to a deployment direction of the first radiator panel from a state where the second radiator panel is opposed to the north or south face of the body structure of the satellite.

Advantageous Effects of Invention

In the deployable radiator according to the present invention, the first radiator panel is connected to the body structure of the satellite by the first deployment mechanism. The first deployment mechanism deploys the first radiator panel from the state where the first radiator panel is opposed to the north or south face of the body structure of the satellite. The second radiator panel is stacked with the first radiator panel to be opposed to the north or south face of the body structure of the satellite and is sandwiched between the body structure of the satellite and the first radiator panel, in the state where the first radiator panel is opposed to the north or south face of the body structure of the satellite. The second deployment mechanism connects the second radiator panel to the body structure of the satellite and deploys the second radiator panel in the direction opposite to the deployment direction of the first radiator panel from the state where the second radiator panel is opposed to the north or south face of the body structure of the satellite. Consequently, according to the deployable radiator of the present invention, an area of the radiator panels held on the north or south face of the body structure of the satellite can be reduced. Thus, an increase in a mass of the satellite can be reduced and a degree of freedom in disposition of apparatuses of the satellite can be improved. Since the deployable radiator is stowed on the north or south face of the body structure of the satellite, it becomes possible to restrain spacecraft heat loss during orbit raising and further improve an amount of heat removal after the satellite has reached a geostationary orbit.

DESCRIPTION OF EMBODIMENTS

Hereinafter, embodiments of the present invention will be described, using the drawings. A same reference numeral is given to the same or equivalent portions in the respective drawings. In the description of the embodiments, explanations of the same or equivalent portions will be suitably omitted or simplified.

First Embodiment

*Description of Configuration*

Figure 1:
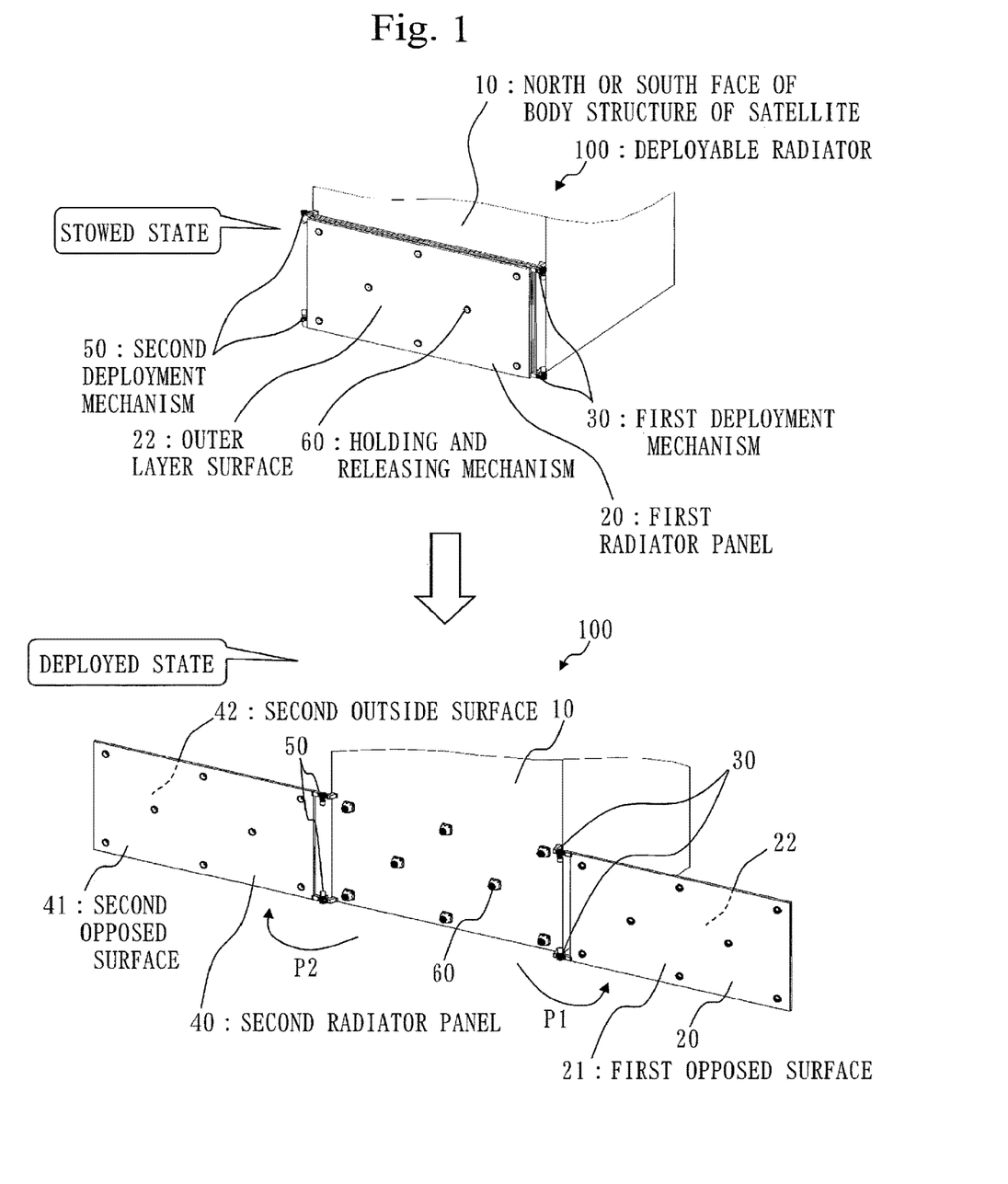
FIG. 1 is a configuration diagram of a deployable radiator 100 according to a first embodiment.

A configuration of a deployable radiator 100 according to this embodiment will be described, using FIG. 1. FIG. 1 illustrates a stowed state and a deployed state of the deployable radiator 100.

The deployable radiator 100 is mounted on a north or south face 10 of the body structure of a satellite.

The deployable radiator 100 includes a first radiator panel 20, a first deployment mechanism 30, a second radiator panel 40, a second deployment mechanism 50, and holding and releasing mechanisms 60.

Hereinafter, illustration of a flexible tube that connects a steam pipe in the body structure of the satellite and a condenser tube in each radiator panel will be omitted.

The first radiator panel 20 is deployably connected to the north or south face 10 of the body structure of the satellite by the first deployment mechanism 30.

The first deployment mechanism 30 connects the first radiator panel 20 to the north or south face 10 of the body structure of the satellite. The first deployment mechanism 30 also deploys the first radiator panel 20 from a state where the first radiator panel 20 is opposed to the north or south face 10 of the body structure of the satellite. A state of the first radiator panel 20 illustrated in the stowed state in FIG. 1 is the state where the first radiator panel 20 is opposed to the north or south face 10 of the body structure of the satellite.

The second radiator panel 40 is deployably connected to the north or south face 10 of the body structure of the satellite by the second deployment mechanism 50. The second radiator panel 40 is stacked with the first radiator panel 20 to be opposed to the north or south face 10 of the body structure of the satellite and is sandwiched between the north or south face 10 of the body structure of the satellite and the first radiator panel 20 in the state where the first radiator panel 20 is opposed to the north or south face 10 of the body structure of the satellite. That is, in the stowed state in FIG. 1, the second radiator panel 40 is sandwiched between the north or south face 10 of the body structure of the satellite and the first radiator panel 20 and is stacked with the first radiator panel 20.

The second deployment mechanism 50 connects the second radiator panel 40 to the north or south face 10 of the body structure of the satellite. The second deployment mechanism 50 also deploys the second radiator panel 40 in a direction P2 opposite to a deployment direction P1 of the first radiator panel, from the state where the second radiator panel 40 is opposed to the north or south face 10 of the body structure of the satellite.

Each holding and releasing mechanism 60 is constituted from a bolt to secure one of the panels, a separation nut to be engaged with the bolt, and a bracket to which those bolt and separation nut are attached, for example. The separation nut is a device in which an internal nut is divided by an electrical signal, thereby releasing the engagement with the bolt. The holding and releasing mechanisms 60 stack and hold the first radiator panel 20 and the second radiator panel 40 in the state where the first radiator panel 20 and the second radiator panel 40 are stacked with each other and are opposed to the north or south face 10 of the body structure of the satellite. That is, in the stowed state in FIG. 1, the holding and releasing mechanisms 60 stack and hold the first radiator panel 20 and the second radiator panel 40. The holding and releasing mechanisms 60 also release the first radiator panel and the second radiator panel from the state where the holding and releasing mechanisms 60 have held the first radiator panel 20 and the second radiator panel 40.

The stowed state in FIG. 1 is the state where the holding and releasing mechanisms 60 have stacked and held the first radiator panel 20 and the second radiator panel 40. The deployed state in FIG. 1 is the state where the holding and releasing mechanisms 60 have released the first radiator panel 20 and the second radiator panel 40.

In the deployable radiator 100, the second radiator panel 40 is first stowed so that the second radiator panel 40 is opposed to the north or south face 10 of the body structure of the satellite, and the first radiator panel 20 is stacked on the stowed second radiator panel 40 from an outside of the stowed second radiator panel 40 so that the first radiator panel 20 is opposed to the north or south face 10 of the body structure of the satellite. Then, two radiator panels using same holding and releasing mechanisms 60 are secured.

In the first radiator panel 20, a surface opposed to the north or south face 10 of the body structure of the satellite is set to a first opposed surface 21, and the opposite surface of the first opposed surface 21 is set to an outer layer surface 22. In the second radiator panel 40, a surface opposed to the north or south face 10 of the body structure of the satellite is set to a second opposed surface 41 and the opposite surface of the second opposed surface 41 is set to a second outside surface 42. As illustrated in FIG. 1, the outer layer surface 22 of the first radiator panel 20 becomes an outermost layer surface that is exposed to space, in the stowed state.

Each of the first deployment mechanism 30 and the second deployment mechanism 50 is a hinge constituted from bearings, a shaft, and brackets, for example. Each of the first deployment mechanism 30 and the second deployment mechanism 50 is driven by a driving source and obtains a panel deployment force.

Each of the first deployment mechanism 30 and the second deployment mechanism 50 is driven by spring elastic energy. Alternatively, each of the first deployment mechanism 30 and the second deployment mechanism 50 may be driven by a motor. Alternatively, each of the first deployment mechanism 30 and the second deployment mechanism 50 may be driven by a combination of the spring elastic energy and the motor.

*Description of Effects of this Embodiment*

Figure 2:
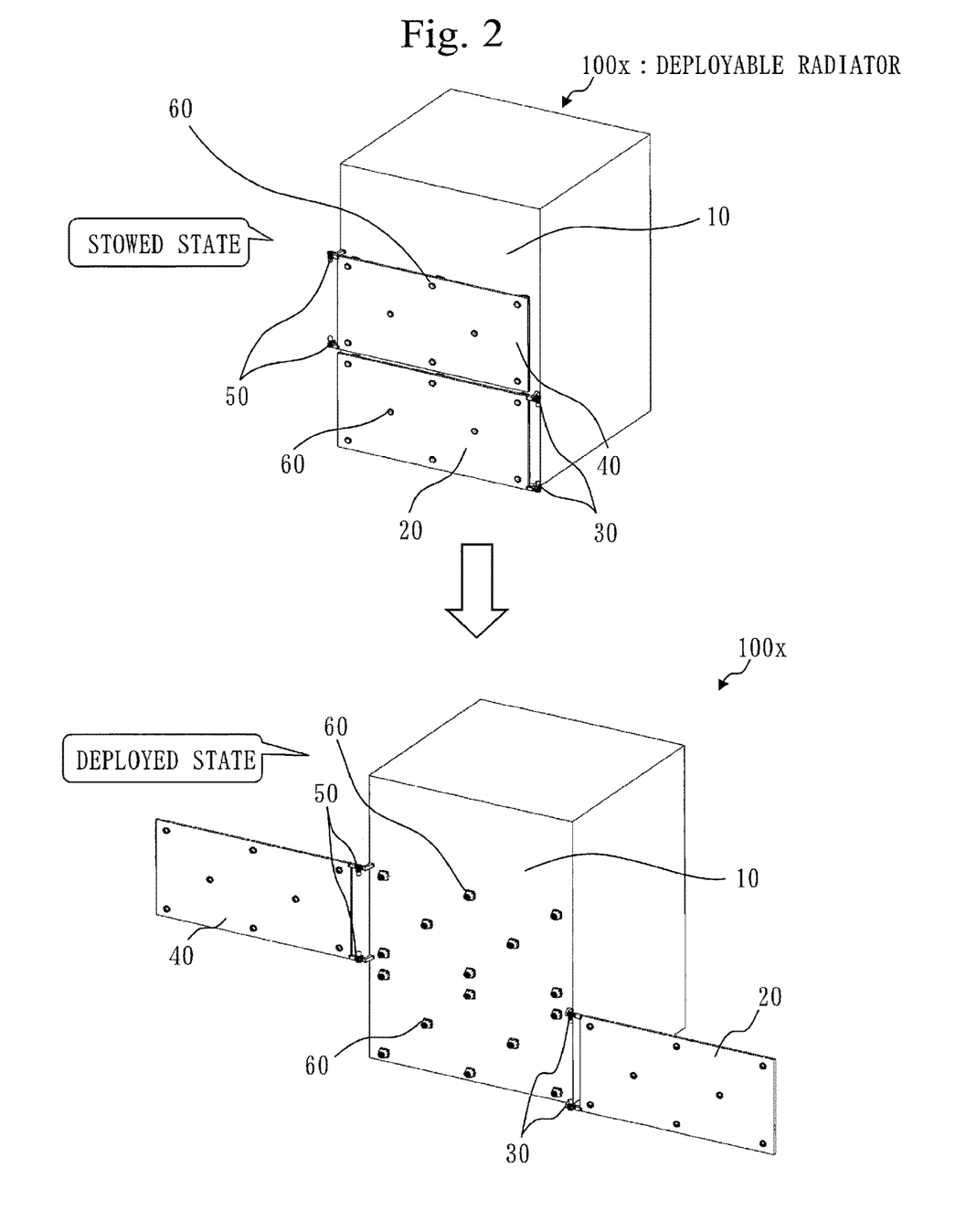
FIG. 2 is a configuration diagram of a deployable radiator 100x of a comparison example for being compared with the deployable radiator 100 according to the first embodiment.

FIG. 2 illustrates a deployable radiator 100x of a comparative example for being compared with the deployable radiator 100 according to this embodiment.

As illustrated in FIG. 2, in the deployable radiator 100x of the comparative example, each of two radiator panels is independently held on a north or south face 10 of the body structure of a satellite in a stowed state so that the two radiator panels are not stacked with each other.

Since each of the radiator panels is independently secured to the north or south face 10 of the body structure of the satellite in the deployable radiator 100x of the comparative example as mentioned above, holding and releasing mechanisms 60 just corresponding to the number of the panels becomes necessary. When eight holding and releasing mechanisms 60 are necessary for each radiator panel, 16 holding and releasing mechanisms 60 become necessary if the number of the radiator panels is two. Accordingly, a mass of the satellite increases, so that manufacturing cost also increases.

In the deployable radiator 100x of the comparative example, each radiator panel is secured to the north or south face 10 of the body structure of the satellite. Thus, an area that is occupied by the radiator panels also doubles. Since the area of the north or south face 10 of the body structure of the satellite that is occupied by the radiator panels in the stowed state is large as mentioned above, a degree of freedom in disposition of apparatuses of the satellite is reduced. To take an example, a problem of apparatus deployment may arise that one of the radiator panels in the stowed state interferes with a solar array wing.

On the other hand, in the deployable radiator 100 according to this embodiment, the two radiator panels are stacked and held in the stowed state. Accordingly, the radiator panels can be stacked and secured to the north or south face 10 of the body structure of the satellite, using the same holding and releasing mechanisms 60. Thus, the holding and releasing mechanisms 60 corresponding to one panel are needed. When eight holding and releasing mechanisms 60 are needed for each radiator panel, for example, it is enough to provide the eight holding and releasing mechanisms 60 even if the number of the radiator panels is two. Consequently, according to the deployable radiator 100 in this embodiment, an increase in a mass of the satellite can be reduced.

According to the deployable radiator 100 in this embodiment, an area of the north or south face 10 of the body structure of the satellite that is occupied by the radiator panels in the stowed state is smaller than that in the deployable radiator 100x of the comparative example. Specifically, in the deployable radiator 100 in FIG. 1, the area of the north or south face 10 of the body structure of the satellite that is occupied by the radiator panels is a half of that in the deployable radiator 100x of the comparative example. Consequently, according to the deployable radiator 100 in this embodiment, a degree of freedom in disposition of apparatuses of the satellite increases. To take an example, the degree of freedom in the disposition of the apparatuses of the satellite increases in such a manner that the radiator panels in the stowed state and a solar array wing can be mounted side-by-side.

In the deployable radiator 100 according to this embodiment, the deployment mechanism for each radiator can be driven by the spring elastic energy. Consequently, according to the deployable radiator 100 in this embodiment, the deployment mechanism can be implemented without using a complex component such as the motor or a motor driving power source.

On the other hand, in the deployment radiator 100 according to this embodiment, the deployment mechanism for each radiator may be driven by the motor. According to the deployable radiator 100 in this embodiment, by driving by the motor, the panels can be deployed by control of the motor so that the panels do not interfere with each other. Further, since a torque that is larger than a spring force can be generated, a large radiator panel can be accommodated. Further, according to the operation of the satellite, each radiator panel can be oriented on an orbit at an optimal angle and at an arbitrary timing. Further, according to the operation of the satellite, power consumption for temperature control of the satellite can be reduced by orienting each radiator panel on the orbit at an arbitrary timing such as a timing when the attitude of the satellite is abnormal and then returning each radiator panel to the stowed state.

Second Embodiment

In this embodiment, a difference from the first embodiment will be mainly described.

In this embodiment, a same reference numeral is given to a component that is the same as the one described in the first embodiment, and a description of the component may be omitted.

In this embodiment, a description will be given about a deployable radiator 100a in which, while minimizing spacecraft heat loss during orbit raising, an amount of heat removal after a satellite has reached a geostationary orbit can be more maximized than that in the first embodiment and a mass of the satellite can be minimized.

*Description of Configuration*

A configuration of the deployable radiator 100a according to this embodiment will be described, using FIG. 3.

Figure 3:
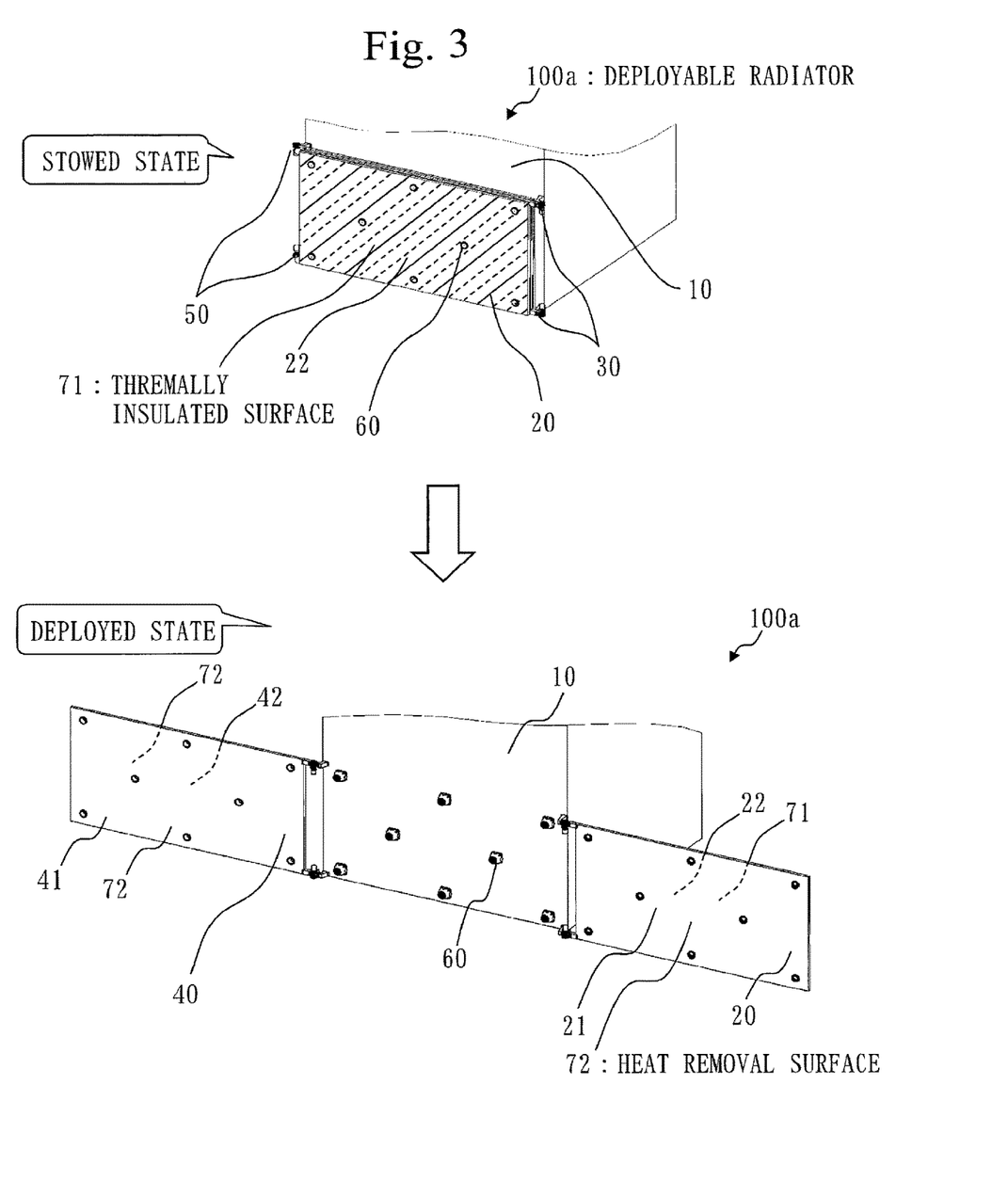
FIG. 3 is a configuration diagram of a deployable radiator 100a according to a second embodiment.

As illustrated in FIG. 3, the outer layer surface 22 of the first radiator panel 20 becomes an outermost layer surface in a stowed state. Accordingly, in order to minimize the spacecraft heat loss during the orbit raising, it is necessary to thermally insulate the outer layer surface 22 of the first radiator panel 20 that becomes the outermost layer surface. That is, it is necessary not to make heat escape from the outer layer surface 22 of the first radiator panel 20 that becomes the outermost layer surface.

At least a portion of the outer layer surface 22 which is the opposite surface of the first opposed surface 21 that is opposed to the north or south face 10 of the body structure of the satellite is thermally insulated. To take an example, the at least portion of the outer layer surface 22 of the first radiator panel is set to a thermally insulated surface 71. Specifically, the thermally insulated surface 71 is generated by attaching a thermal insulation material to the outer layer surface 22. More specifically, the thermally insulated surface 71 is generated by attaching a multi-layer insulation (Multi layer Insulation) composed of a polyimide film or the like to the outer layer surface 22.

An amount of heat removal from the thermally insulated surface 71 to which this multi-layer insulation is attached becomes substantially zero.

The first opposed surface 21 of the first radiator panel 20, the second opposed surface 41 of the second radiator panel 40, and the second outside surface 42 of the second radiator panel 40 are heat removal surfaces 72 from which heats are removed. The second outside surface 42 is also referred to as a second intermediate surface. It is necessary to remove the heats of the first opposed surface 21 of the first radiator panel 20 and both surfaces of the second radiator panel 40 in a deployed state.

A description will be given about the deployable radiator 100a according to this embodiment while making comparison with a case where surfaces of the radiator panels in the deployable radiator in each of FIGS. 1 and 2 are all heat removal surfaces 72.

Generally, a deployable radiator includes the following features:

(1) A heat removal area greatly differs between a deployed state and a stowed state of the deployable radiator. Therefore, the deployable radiator reduces an amount of heat removal as much as possible when orbit raising is performed while ensuring a maximum amount of heat removal when a satellite reaches a geostationary orbit, thereby enabling reduction of electric power necessary for maintaining a satellite temperature.

(2) Usually, both surfaces of each radiator panel are heat removal surfaces in order to maximize an amount of heat removal from the radiator panel in the deployed state.

(3) Since a temperature of each radiator panel is lower than a temperature of the north or south face of the body structure surface of the satellite, the radiator panel has a lower heat removal efficiency than the body structure surface of the satellite. With respect to a difference between the heat removal efficiencies, the heat removal amount of the radiator panel is approximately 140 W per square meters while the heat removal amount of the body structure surface of the satellite is 200 W per square meters. That is, the heat removal amount of the radiator panel is approximately 70% of the heat removal amount of the body structure surface of the satellite.

(4) The shorter a flexible tube is, the higher the heat removal efficiency of the radiator is. Thus, it is necessary to minimize the length of the flexible tube to be used. Accordingly, it is not practical to connect the radiator panels in the form of a folding screen, as in a solar array wing. Therefore, the deployable radiator has a configuration in which each radiator is directly connected to the satellite.

A description will be given, using, as a first example, a case where all the surfaces of the radiator panels in the deployable radiator 100x of the comparative example are the heat removal surfaces 72. In the case of the first example, the north or south face 10 of the body structure of the satellite is covered by an area corresponding to the two radiator panels, in the stowed state. Thus, an amount of heat removal in the stowed state can be reduced to be small. This is because the heat removal efficiency of each radiator panel is smaller than the heat removal efficiency of the body structure surface of the satellite, as mentioned above.

A trial calculation will be made below for the example. It is assumed that the (one side) area of each radiator panel is 1 square meter, the amount of heat removal from the north or south face of the body structure surface of the satellite is 200 W per square meter, and the amount of heat removal from each radiator panel is 140 W per square meter.

In the stowed state, heat removal is performed to space from the area of 2 square meters corresponding to the two radiator panels, so that the amount of the heat removal is calculated to be 2×140=280 W.

In a deployed state, an amount of heat removal is calculated to be 2×200+4×140=960 W because the area of the body structure surface of the satellite is 2 square meters and areas of both sides of the two radiator panels are 4 square meters.

Herein, 960/280≈3.4 holds, thereby indicating that the amount of the heat removal in the deployed state is 3.4 times the amount of the heat removal in the stowed state. Assume that the amount of the heat removal in the deployed state is constant. Then, the larger a ratio between the amount of the heat removal in the deployed state and the amount of the heat removal in the stowed state is, the less the amount of the heat removal in the stowed state is. Thus, when orbit raising is performed, the satellite can reduce electric power to be used for temperature maintenance of the satellite.

Subsequently, a description will be given, using a case where all the surfaces of each radiator panel are the heat removal surfaces 72 in the deployable radiator 100 illustrated in FIG. 1, as a second example. In the case of the second example, the north or south face 10 of the body structure of the satellite is overlapped by an area corresponding to one radiator panel, in the stowed state. Thus, an amount of heat removal in the stowed state becomes larger than that of the deployable radiator 100x of the comparative example illustrated in FIG. 2.

A trial calculation will be made below for the example. It is assumed that the area of each radiator panel is 1 square meter, the amount of heat removal from the north or south face of the body structure surface of the satellite is 200 W per square meter, and the amount of heat removal from each radiator panel is 140 W per square meter.

In the stowed state, the heat removal is performed to space from the body structure surface of the satellite of 1 square meter and the area of 1 square meter corresponding to one radiator panel, so that the amount of the heat removal is calculated to be 1×200+1×140=340 W.

In the deployed state, an amount of heat removal is calculated to be 2×200+4×140=960 W because the area of the body structure surface of the satellite is 2 square meters and areas of both sides of the two radiator panels are 4 square meters.

Herein, 960/340≈2.8 holds, thereby indicating that the amount of the heat removal in the deployed state is 2.8 times the amount of the heat removal in the stowed state. 340/280≈120% holds. Thus, in the second example, when orbit raising is performed, electric power to be used for temperature maintenance of the satellite increases from that in the first example by 20%.

Subsequently, the deployable radiator 100a illustrated in FIG. 3 will be described.

In the deployable radiator 100a according to this embodiment, the multi-layer insulation is attached to the outermost layer surface of the radiator panels on the side opposite to the north or south side 10 of the body structure of the satellite, with respect to the radiator panels stacked up at a time of the stowed state, so that an amount of heat removal becomes substantially zero.

A trial calculation will be made below for the example. It is assumed that the area of each radiator panel is 1 square meter, the amount of heat removal from the north or south face of the body structure surface of the satellite is 200 W per square meter, and the amount of heat removal from each radiator panel is 140 W per square meter.

In the stowed state, the outermost layer surface of the radiator panels is thermally insulated. Thus, heat removal is performed to space just from the body structure surface of the satellite of 1 square meter, so that an amount of heat removal is calculated to be 1×200=200 W.

In the deployed state, one surface among a total of the body structure surface of the satellite of 2 square meters and both sides of two radiator panels of 4 square meters is the thermally insulated surface, so that an amount of heat removal is calculated to be 2×200+3×140=820 W.

Herein, 820/200=4.1 holds, thereby indicating that the amount of the heat removal in the deployed state is 4.1 times the amount of the heat removal in the stowed state. This ratio is larger than that in the first example.

The absolute quantity of the amount of the heat removal in the deployed state is smaller than 960 W in the first example. However, when the size of each radiator panel is enlarged to unify an amount of heat removal in the deployed state to 960 W, the amount of the heat removal in the stowed state in the deployable radiator 100a becomes 960/4.1=234 W. Thus, the amount of the heat removal in the stowed state is reduced to be smaller than the amount of the heat removal of 280 W in the first example.

*Description of Effect of this Embodiment*

The deployable radiator 100a according to this embodiment includes a thermally insulated region in at least the portion of the outer layer surface of the first radiator panel that becomes the outermost layer surface in the stowed state. Then, the other surface of the first radiator panel and the both surfaces of the second radiator panel in the deployable radiator 100a are the heat removal surfaces. Consequently, according to the deployable radiator 100a in this embodiment, the deployable radiator 100a is stowed on the north or south face of the body structure of the satellite. Thus, an amount of heat removal after the satellite has reached a geostationary orbit can be maximized while minimizing spacecraft heat loss during orbit raising, and satellite resources to be used, such as a mass of the satellite, can be minimized.

Third Embodiment

In this embodiment, a difference from the first embodiment and the second embodiment will be mainly described.

In this embodiment, a same reference numeral is given to a component that is the same as the component described in the first and second embodiments, and a description of the component may be omitted.

*Description of Configuration*

A configuration of a deployable radiator 100b according to this embodiment will be described, using FIG. 4.

In this embodiment, it is assumed that both surfaces of the first radiator panel 20 and both surfaces of the second radiator panel 40 are the heat removal surfaces 72.

Figure 4:
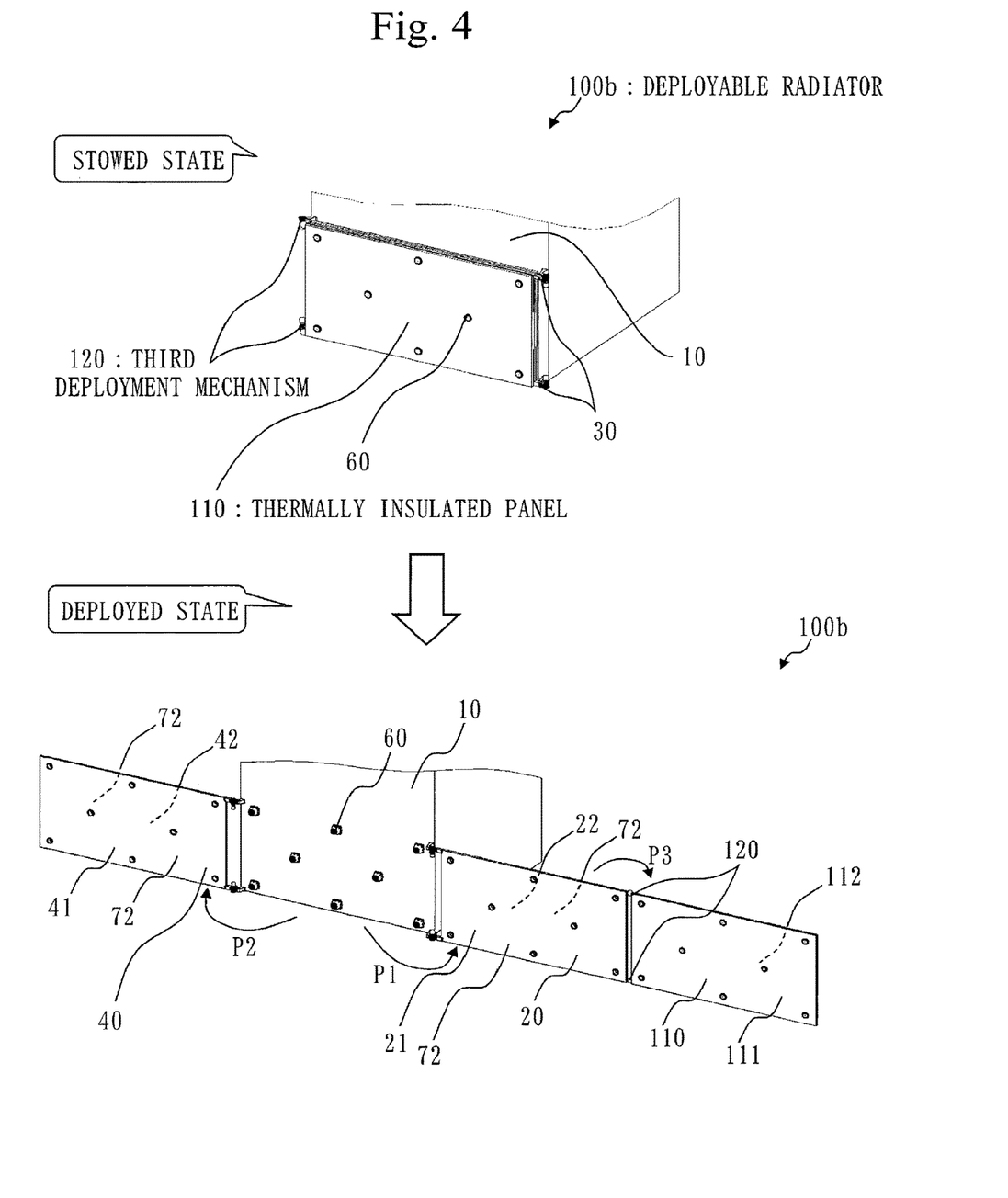
FIG. 4 is a configuration diagram of a deployable radiator 100b according to a third embodiment.

As illustrated in FIG. 4, the first radiator panel 20 includes a thermally insulated panel 110 that covers at least a portion of the outer layer surface 22 in a state where the first radiator panel 20 is opposed to the north or south face 10 of the body structure of a satellite. The thermally insulated panel 110 is also referred to as a thermal shield panel, and is the one in which the surface of a sandwich plate formed of CFRP (Carbon Fiber Reinforced Plastics) and an aluminum honeycomb core is covered with a multi-layer insulation, like a solar battery panel. The first radiator panel 20 includes the thermally insulated panel 110 that is deployably connected to the leading end portion of the first radiator panel 20 when the first radiator panel 20 is deployed in a deployment direction P1.

In the thermally insulated panel 110, a surface opposed to the first radiator panel 20 in a stowed state, or a surface opposed to the north or south face 10 of the body structure of the satellite is set to a third opposed surface 111. Further, in the thermally insulated panel 110, a surface that becomes an outermost layer surface in the stowed state or the opposite surface of the third opposed surface 111 is set to a third outside surface 112. In the thermally insulated panel 110, at least a portion of the third outside surface 112 is set to a thermally insulated surface. Alternatively, the entirety of the thermally insulated panel 110 may be formed of a thermal insulation material.

The deployable radiator 100b includes a third deployment mechanism 120 that deployably connects the thermally insulated panel 110 to the first radiator panel 20. After the deployment of the first radiator panel 20 in the deployment direction P1 by the first deployment mechanism 30 has been started, the third deployment mechanism 120 deploys the thermally insulated panel 110 in a deployment direction P3. The third deployment mechanism 120 may be driven by a spring or a motor.

The holding and releasing mechanisms 60 stacks and holds the first radiator panel 20, the second radiator panel 40, and the thermally insulated panel 110, in the stowed state.

Though the rotation axis of the first deployment mechanism 30 and the rotation axis of the third deployment mechanism 120 are parallel in FIG. 4, the rotation axis of the third deployment mechanism 120 may be rotated by 90 degrees. That is, it may be so configured that the thermally insulated panel 110 is deployably connected at the upper end or the lower end of the first radiator panel 20 and that the thermally insulated panel 110 is deployed from the first radiator panel 20 to an upper side or a lower side of FIG. 4.

*Description of Effect of this Embodiment*

According to the deployable radiator 100b in this embodiment, even if the both surfaces of the first radiator panel 20 and the both surfaces of the second radiator panel 40 have been set to the heat removal surfaces, the outermost layer surface can be thermally insulated in the stowed state. Consequently, according to the deployable radiator 100b in this embodiment, an amount of heat removal after the satellite has reached a geostationary orbit can be further increased while minimizing spacecraft heat loss during orbit raising.

Fourth Embodiment

In this embodiment, a difference from the first to third embodiments will be mainly described.

In this embodiment, a same reference numeral is given to a component that is the same as the component described in the first to third embodiments, and a description of the component may be omitted.

*Description of Configuration*

A configuration of a deployable radiator 100c according to this embodiment will be described, using FIG. 5.

The deployable radiator 100c according to this embodiment includes a deployment delay mechanism 140 to start deployment of the second radiator panel 40 after the first radiator panel 20 has been deployed by 90 degrees or more. The deployment delay mechanism 140 includes a cam 142 provided at the root of the first radiator panel 20 and a roller 141 provided at the leading end of the second radiator panel 40.

Figure 6:
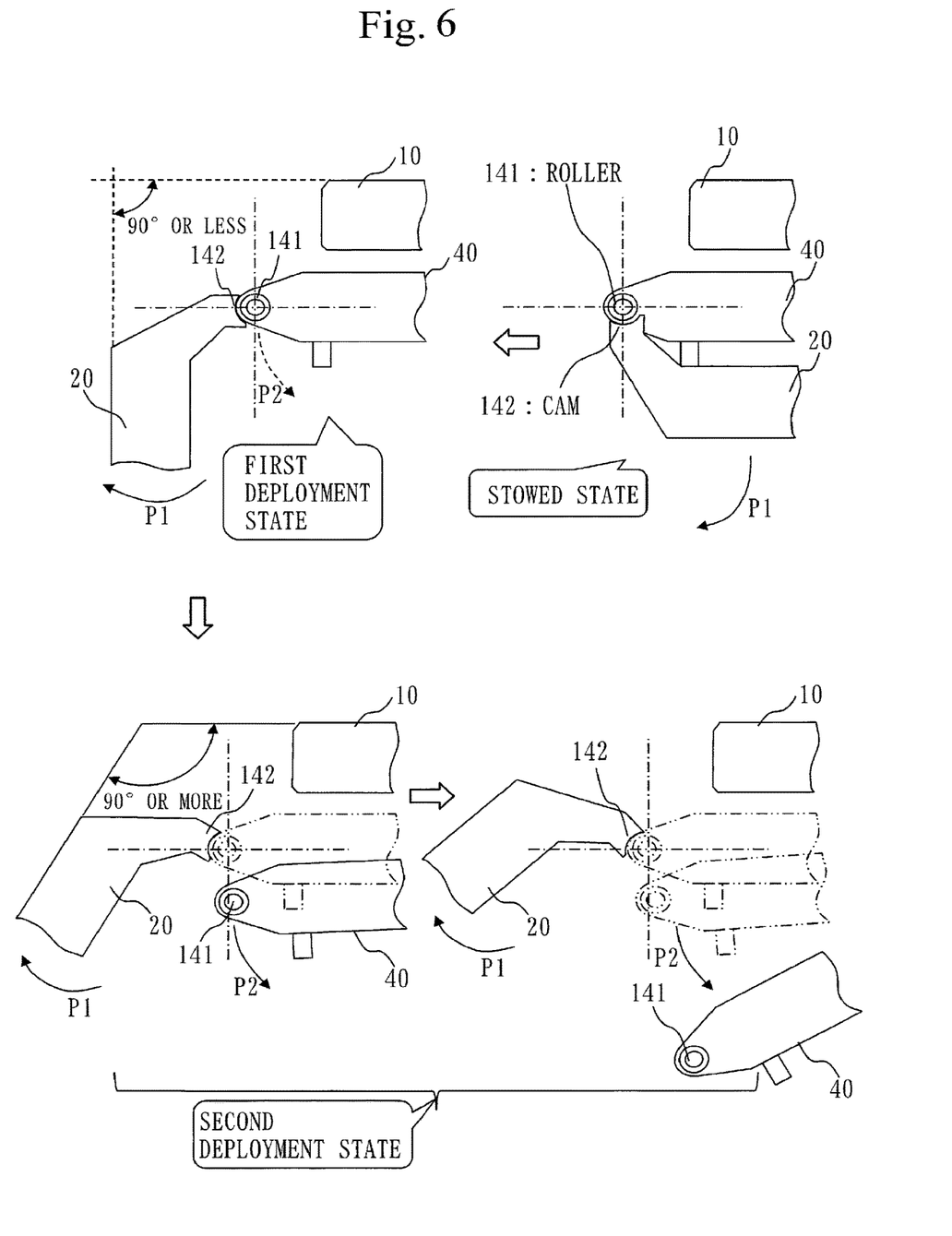
FIG. 6 is a diagram illustrating state transitions of a deployment delay mechanism 140 according to the fourth embodiment.

FIG. 6 is a diagram illustrating state transitions of the deployment delay mechanism 140 according to this embodiment.

A configuration of the deployment delay mechanism 140 will be described, using FIGS. 5 and 6.

Figure 5:
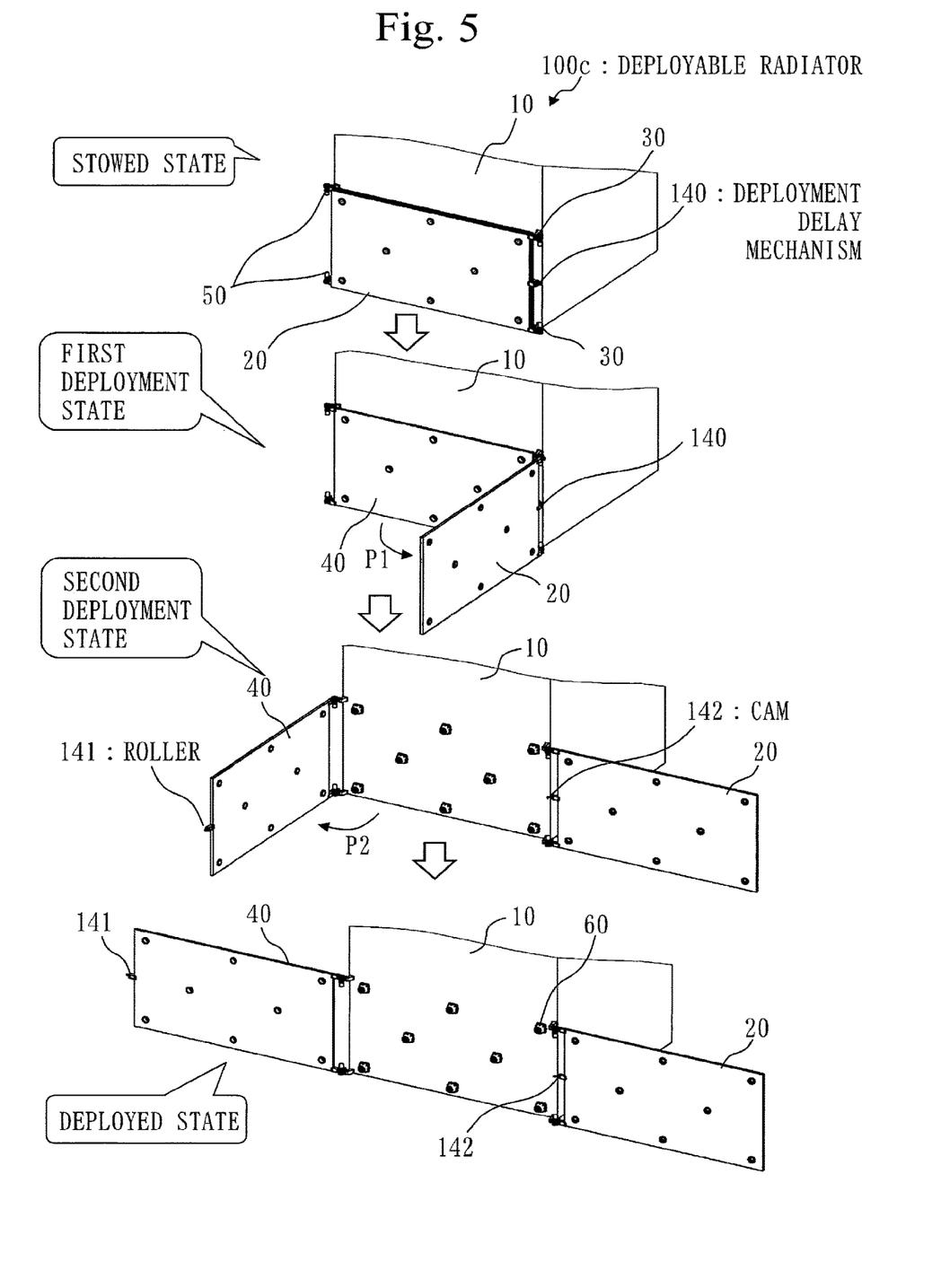
FIG. 5 is a configuration diagram of a deployable radiator 100c according to a fourth embodiment.

As illustrated in FIG. 5, the deployment delay mechanism 140 includes the cam 142 at the root of the first radiator panel 20 and the roller 141 at the leading end of the second radiator panel 40. Though the roller 141 is positioned in the center of the first deployment mechanism 30 when a pair of two upper and lower radiator panels are positioned separated from each other, the rotation center of the first deployment mechanism 30 and the rotation center of the roller 141 coincide on a same straight line.

FIG. 5 illustrates a stowed state, a first deployment state, a second deployment state, and a deployed state. FIG. 6 illustrates the roller 141 and the cam 142 in the stowed state, the roller 141 and the cam 142 in the first deployment state, and the roller 141 and the cam 142 in the second deployment state.

The stowed state is the one in which the first radiator panel 20 and the second radiator panel 40 are stowed opposed to the north or south face 10 of the body structure of a satellite.

The first deployment state is the one in which the first radiator panel 20 has been deployed up to 90 degrees or less.

Since the roller 141 is restrained by the cam 142 from the stowed state to the first deployment state, the second radiator panel 40 cannot be deployed in a deployment direction P2. Specifically, in a state where the deployment angle of the first radiator panel 20 is up to the 90 degrees or less, the roller 141 is restrained by the cam 142. It may be so configured, for example, that the roller 141 is restrained by the cam 142 up to the deployment angle of 86 degrees, 87 degrees, or 89 degrees, and the restraint of the roller 141 by the cam 142 is released at a deployment angle equal to or more than 86, 87, or 89 degrees. In the following description, the description will be given, assuming that the restraint of the roller 141 by the cam 142 is released at the deployment angle of 90 degrees.

In the first deployment state, the first radiator panel 20 is deployed by 90 degrees and the restraint by the cam 142 is released from the roller 141, so that the deployment of the second radiator panel 40 in the deployment direction P2 becomes possible.

In the second deployment state, the first radiator panel 20 is deployed by 90 degrees or more and the second radiator panel 40 is deployed in the deployment direction P2, so that the first radiator panel 20 completes the deployment.

The deployed state is a state where each of the first radiator panel 20 and the second radiator panel 40 has completed the deployment. That is, the deployed state is a fully deployed state.

With respect to an operation of the deployment delay mechanism 140 from the stowed state to the first deployment state where the first radiator panel is deployed up to approximately 90 degrees, the cam 142 restrains the roller 141. Thus, the second radiator panel 40 maintains a state where the second radiator panel 40 is stowed. When the deployment of the first radiator panel 20 exceeds approximately 90 degrees, the restraint by the cam 142 is released, so that the roller 141 becomes free. Thus, the second radiator panel 40 starts the deployment. Due to this deployment delay, two radiator panels do not interfere with each other during the deployments.

As an alternative method, the roller may be restrained by an electromagnetic actuator instead of the cam and may be released by an electrical signal. Any other method may be adopted if the above-mentioned function of the deployment delay mechanism can be implemented.

*Description of Effects of this Embodiment*

The deployable radiator 100c according to this embodiment includes the deployment delay mechanism for starting the deployment of the second radiator panel after deployment of the first radiator panel by approximately 90 degrees or more. Consequently, according to the deployable radiator 100c in this embodiment, the two radiator panels do not collide with each other during the deployments. Thus, the deployments can be performed without damaging the radiator panels. According to the deployable radiator 100c in this embodiment, a deployment failure due to interference or sticking between the radiator panels is prevented, thereby allowing improvement in deployment reliability.

Fifth Embodiment

In this embodiment, a difference from the first to fourth embodiments will be mainly described.

In this embodiment, a same reference numeral is given to a component that is the same as the component described in the first to fourth embodiments, and a description of the component may be omitted.

In this embodiment, variations of the deployable radiator 100x described using FIG. 2 in the first embodiment will be described.

A deployable radiator 100d according to this embodiment will be described, using FIG. 7.

As illustrated in FIG. 2, in the deployable radiator 100d, each of the two radiator panels is independently held on the north or south face 10 of the body structure of a satellite so that the two radiator panels are not stacked with each other in the stowed state. Consequently, an outer layer surface 22 of a first radiator panel 20 becomes an outermost layer surface and a second outside surface 42 of a second radiator panel 40 also becomes an outermost layer surface, in the stowed state.

At least a portion of each of the outer layer surface 22 and the second outside surface 42 becomes the thermally insulated surface 71. Specifically, the thermally insulated surface 71 is generated by attaching a thermal insulation material to each of the outer layer surface 22 and the second outside surface 42. More specifically, the thermally insulated surface 71 is generated by attaching a multi-layer insulation to each of the outer layer surface 22 and the second outside surface 42. An amount of heat removal from the thermally insulated surface 71 with this multi-layer insulation attached thereto becomes substantially zero.

Figure 7:
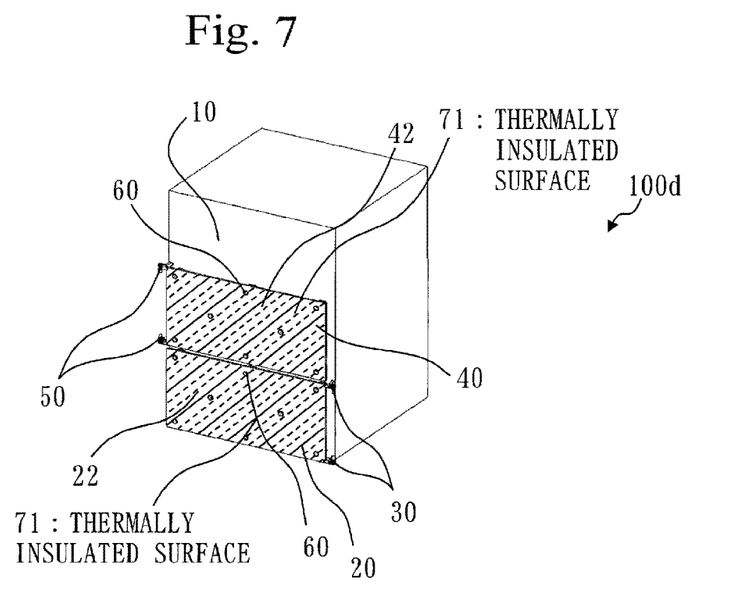
FIG. 7 is a configuration diagram of a deployable radiator 100d according to a fifth embodiment.

In the deployable radiator 100d in FIG. 7, the at least the portion of each of the outer layer surface 22 and the second outside surface 42 that become outermost layer surfaces in the stowed state are set to a thermally insulated region.

Consequently, according to the deployable radiator 100d in this embodiment, spacecraft heat loss during orbit raising can be reduced.

A deployable radiator 100e according to this embodiment will be described, using FIG. 8.

Figure 8:
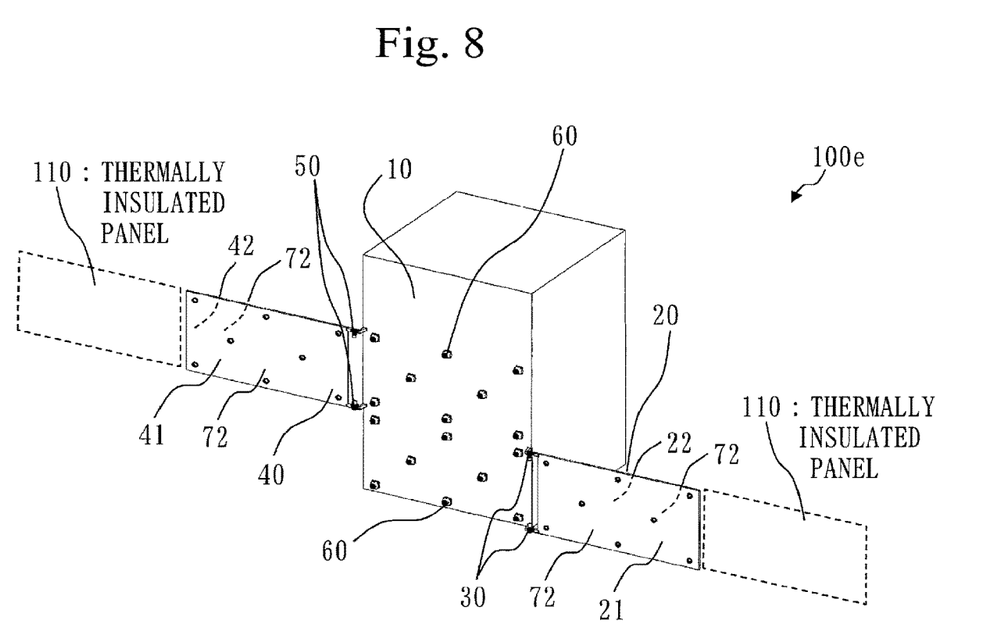
FIG. 8 is a configuration diagram of a deployable radiator 100e according to the fifth embodiment.

As illustrated in FIG. 8, an outer layer surface 22 and a second outside surface 42 respectively includes thermally insulated panels 110 that are deployably connected to the leading ends of a first radiator panel 20 and a second radiator panel 40. These thermally insulated panels 110 are each the same as the thermally insulated panel 110 described in the third embodiment.

In the stowed state, each of the outer layer surface 22 and the second outside surface 42 in the deployable radiator 100e is thermally insulated by the thermally insulated panel 110. In this case, each of the first radiator panel 20 and the second radiator panel 40 and each thermally insulated panel 110 are connected by the third deployment mechanism 120 described in the third embodiment.

It is assumed that in the deployable radiator 100e, both surfaces of the first radiator panel 20 and both surfaces of the second radiator panel 40 are the heat removal surfaces 72.

In the deployable radiator 100e in FIG. 8, at least a portion of each of the outer layer surface 22 and the second outside surface 42 that become outermost layer surfaces in the stowed state is thermally insulated by the thermally insulated panel. Further, the both surfaces of the first radiator panel 20 and the both surfaces of the second radiator panel 40 are the heat removal surfaces 72. Consequently, according to the deployable radiator 100e in this embodiment, spacecraft heat loss during orbit raising can be reduced, and an amount of heat removal after the satellite has reached a geostationary orbit can be further increased.

Though the description has been given about the first to fifth embodiments, a plurality of these embodiments may be carried out in combination. Alternatively, a plurality of portions of these embodiments may be carried out in combination. Alternatively, one portion of these embodiments may be carried out. In addition, these embodiments may be wholly or partially carried out in any combination. That is, within the scope of the invention, a free combination of the respective embodiments, a variation of an arbitrary component in each embodiment, or an omission of an arbitrary component in each embodiment is possible.

Each embodiment mentioned above is an essentially preferred illustration, and does not intend to limit the present invention, or an application or an application range of the present invention. Various modifications are possible as necessary. Each embodiment mentioned above is for helping understanding of the method of the present invention and does not intend to limit the invention.

REFERENCE SIGNS LIST 100, 100a, 100b, 100c, 100d, 100e, 100x: deployable radiator; 10: north or south face of body structure of satellite; 20: first radiator panel; 21: first opposed surface; 22: outer layer surface; 30: first deployment mechanism; 40: second radiator panel; 41: second opposed surface; 42: second outside surface; 50: second deployment mechanism; 60: holding and releasing mechanism; 71: thermally insulated surface; 72: heat removal surface; 110: thermally insulated panel; 111: third opposed surface; 112: third outside surface; 120: third deployment mechanism; 140: deployment delay mechanism; 141: roller; 142: cam

The invention claimed is:

1. A deployable radiator mounted on a body structure of a satellite, the deployable radiator comprising:
   a first radiator panel;
   a first deployment mechanism to connect the first radiator panel to the body structure of the satellite and to deploy the first radiator panel from a state where the first radiator panel is opposed to a north or south face of the body structure of the satellite;
   a second radiator panel stacked with the first radiator panel to be opposed to the north or south face of the body structure of the satellite and sandwiched between the body structure of the satellite and the first radiator panel, in the state where the first radiator panel is opposed to the body structure of the satellite; and
   a second deployment mechanism to connect the second radiator panel to the body structure of the satellite and to deploy the second radiator panel in a direction opposite to a deployment direction of the first radiator panel from a state where the second radiator panel is opposed to the north or south face of the body structure of the satellite,
   wherein in the first radiator panel, an outer layer surface that is the opposite surface of a first opposed surface opposed to the north or south face of the body structure of the satellite is a thermally insulated surface and the first opposed surface is a heat removal surface, and
   wherein in the second radiator panel, a second opposed surface opposed to the north or south face of the body structure of the satellite and the opposite surface of the second opposed surface are heat removal surfaces.

2. The deployable radiator according to claim 1, comprising:
   a holding and releasing mechanism to stack and hold the first radiator panel and the second radiator panel in a state where the first radiator panel and the second radiator panel are stacked up and opposed to the north or south face of the body structure of the satellite and to release the first radiator panel and the second radiator panel from a state where the holding and releasing mechanism have held the first radiator panel and the second radiator panel.

3. The deployable radiator according to claim 2,
   wherein in the first radiator panel, a thermal insulation material is attached to at least a portion of the outer layer surface.

4. The deployable radiator according to claim 3,
   wherein in the first radiator panel, the thermal insulation material is multilayer insulation composed of a polyimide film.

5. The deployable radiator according to claim 2,
   wherein the first radiator panel includes a thermally insulated panel to cover the at least the portion of the outer layer surface in the state where the first radiator panel is opposed to the body structure of the satellite.

6. The deployable radiator according to claim 5, comprising:
   a third deployment mechanism to deployably connect the thermally insulated panel to the first radiator panel.

7. The deployable radiator according to claim 1, further comprising:
   a deployment delay mechanism to start deployment of the second radiator panel after the first radiator panel has been deployed by 90 degrees or more; and
   a holding and releasing mechanism to stack and hold, during orbit raising of the satellite, the first radiator panel and the second radiator panel in a stowed state where the first radiator panel and the second radiator panel are stacked up and opposed to the north or south face of the body structure of the satellite, and to release, when the satellite reaches a geostationary orbit, the first radiator panel and the second radiator panel from a state where the holding and releasing mechanism have held the first radiator panel and the second radiator panel, wherein the thermally insulated surface of the outer layer surface of the first radiator panel is covered with a thermal insulation material.

8. The deployable radiator according to claim 7,
wherein the deployment delay mechanism includes a cam provided at a root of the first radiator panel and a roller provided at a leading end of the second radiator panel.

9. A deployable radiator mounted on a body structure of a satellite, the deployable radiator comprising:
a first radiator panel;
a first deployment mechanism to connect the first radiator panel to the body structure of the satellite and to deploy the first radiator panel from a state where the first radiator panel is opposed to a north or south face of the body structure of the satellite;
a second radiator panel stacked with the first radiator panel to be opposed to the north or south face of the body structure of the satellite and sandwiched between the body structure of the satellite and the first radiator panel, in the state where the first radiator panel is opposed to the body structure of the satellite; and
a second deployment mechanism to connect the second radiator panel to the body structure of the satellite and to deploy the second radiator panel in a direction opposite to a deployment direction of the first radiator panel from a state where the second radiator panel is opposed to the north or south face of the body structure of the satellite,
wherein in the first radiator panel, a first opposed surface opposed to the north or south face of the body structure of the satellite and an outer layer surface that is an opposite surface of the first opposed surface are heat removal surfaces, and
wherein in the second radiator panel, a second opposed surface opposed to the north or south face of the body structure of the satellite and the opposite surface of the second opposed surface are heat removal surfaces, and
wherein in the first radiator panel, a thermal insulation material is attached to at least a portion of the outer layer surface.

10. The deployable radiator according to claim 9, comprising:
a holding and releasing mechanism to stack and hold the first radiator panel and the second radiator panel in a state where the first radiator panel and the second radiator panel are stacked up and opposed to the north or south face of the body structure of the satellite and to release the first radiator panel and the second radiator panel from a state where the holding and releasing mechanism have held the first radiator panel and the second radiator panel.

11. The deployable radiator according to claim 10,
wherein the first radiator panel includes a thermally insulated panel to cover the at least the portion of the outer layer surface in the state where the first radiator panel is opposed to the body structure of the satellite.

12. The deployable radiator according to claim 11, comprising:
a third deployment mechanism to deployably connect the thermally insulated panel to the first radiator panel.

13. The deployable radiator according to claim 9,
wherein in the first radiator panel, the thermal insulation material is multilayer insulation composed of a polyimide film.

14. The deployable radiator according to claim 9, further comprising:
a thermally insulated panel to be deployably connected to the first radiator panel;
a third deployment mechanism to deploy the thermally insulated panel;
a deployment delay mechanism to start deployment of the first radiator panel after the thermally insulated panel has been deployed by 90 degrees or more, and to start deployment of the second radiator panel after the first radiator panel has been deployed by 90 degrees or more; and
a holding and releasing mechanism to stack and hold, during orbit raising of the satellite, the first radiator panel and the second radiator panel in a stowed state where the thermally insulated panel and the second radiator panel are stacked up and opposed to the north or south face of the body structure of the satellite, and to release, when the satellite reaches a geostationary orbit, the thermally insulated panel, the first radiator panel, and the second radiator panel from a state where the holding and releasing mechanism have held the thermally insulated panel, the first radiator panel, and the second radiator panel.

* * * * *